(12) United States Patent
Acker

(10) Patent No.: US 10,866,120 B2
(45) Date of Patent: Dec. 15, 2020

(54) SENSOR

(71) Applicant: Continental Teves AG & Co. oHG, Frankfurt (DE)

(72) Inventor: Heinrich Acker, Schwalbach (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 50 days.

(21) Appl. No.: 16/071,766

(22) PCT Filed: Feb. 14, 2017

(86) PCT No.: PCT/EP2017/053292
§ 371 (c)(1),
(2) Date: Jul. 20, 2018

(87) PCT Pub. No.: WO2017/140677
PCT Pub. Date: Aug. 24, 2017

(65) Prior Publication Data
US 2019/0025087 A1 Jan. 24, 2019

(30) Foreign Application Priority Data

Feb. 17, 2016 (DE) .................. 10 2016 202 402

(51) Int. Cl.
| | |
|---|---|
| *G01B 7/14* | (2006.01) |
| *G01B 7/30* | (2006.01) |
| *G01R 33/02* | (2006.01) |
| *G01D 5/20* | (2006.01) |
| *G01D 5/14* | (2006.01) |
| *G01D 5/12* | (2006.01) |
| *G01B 7/00* | (2006.01) |
| *G01D 3/08* | (2006.01) |

(Continued)

(52) U.S. Cl.
CPC .......... *G01D 5/2046* (2013.01); *G01B 7/003* (2013.01); *G01D 3/08* (2013.01); *G01D 5/12* (2013.01); *G01D 5/14* (2013.01); *G01D 5/145* (2013.01); *G01D 5/147* (2013.01); *G01D 5/2033* (2013.01); *G01D 5/225* (2013.01); *G01B 7/14* (2013.01); *G01B 7/30* (2013.01); *G01B 11/26* (2013.01)

(58) Field of Classification Search
CPC .......... G01D 5/145; G01D 5/14; G01D 5/147; G01D 5/12; G01B 7/003; G01B 7/14; G01B 7/30; G01B 11/26
USPC .................. 324/51, 55, 200, 207.11, 207.13
See application file for complete search history.

(56) References Cited

U.S. PATENT DOCUMENTS

| | | | |
|---|---|---|---|
| 3,456,132 | A | 7/1969 | Dechelotte |
| 4,969,363 | A | 11/1990 | Mochizuki |

(Continued)

FOREIGN PATENT DOCUMENTS

| | | | |
|---|---|---|---|
| CN | 101317267 A | | 12/2008 |
| CN | 101501454 A | | 8/2009 |

(Continued)

OTHER PUBLICATIONS

DE 19738836 Machine Translation, Mar. 11, 1999 (Year: 1999).*

(Continued)

*Primary Examiner* — Raul J Rios Russo
(74) *Attorney, Agent, or Firm* — RatnerPrestia

(57) ABSTRACT

A sensor, which is based on a coupling between a printed circuit board inductance and a number of attachment inductances that are applied using SMD technology.

17 Claims, 3 Drawing Sheets

(51) Int. Cl.
*G01D 5/22* (2006.01)
*G01B 11/26* (2006.01)

(56) References Cited

U.S. PATENT DOCUMENTS

| | | | |
|---|---|---|---|
| 5,027,066 | A | 6/1991 | Reder |
| 5,539,358 | A | 7/1996 | Hedberg |
| 5,703,576 | A | 12/1997 | Spillman et al. |
| 5,936,399 | A | 8/1999 | Andermo et al. |
| 5,952,822 | A | 9/1999 | Kayserman et al. |
| 6,166,535 | A | 12/2000 | Irle et al. |
| 6,236,199 | B1 | 5/2001 | Irle et al. |
| 6,316,931 | B1 | 11/2001 | Nakagawa et al. |
| 6,828,780 | B2 | 12/2004 | Jagiella et al. |
| 7,719,264 | B2 | 5/2010 | Tiemann |
| 7,825,526 | B2 | 11/2010 | Dirks |
| 8,339,126 | B2 | 12/2012 | Izak et al. |
| 8,421,446 | B2 | 4/2013 | Straubinger et al. |
| 8,730,011 | B2 | 5/2014 | Altmann et al. |
| 9,188,421 | B2 | 11/2015 | Prussmeier et al. |
| 9,752,899 | B2 | 9/2017 | Goto et al. |
| 9,897,468 | B2 | 2/2018 | Niwa et al. |
| 10,060,762 | B2 | 8/2018 | Pfaffinger et al. |
| 2002/0017902 | A1 | 2/2002 | Vasiloiu |
| 2003/0107377 | A1 | 6/2003 | Uzman |
| 2004/0200260 | A1 | 10/2004 | Klosterman et al. |
| 2005/0151614 | A1 | 7/2005 | Dadafshar |
| 2006/0104558 | A1 | 5/2006 | Gallion et al. |
| 2009/0243596 | A1 | 10/2009 | Izak et al. |
| 2010/0006992 | A1* | 1/2010 | Dirks ............... H01L 23/3107 257/676 |
| 2010/0156402 | A1 | 6/2010 | Straubinger et al. |
| 2012/0242380 | A1 | 9/2012 | Edwards |
| 2013/0187643 | A1 | 7/2013 | Lysen et al. |
| 2013/0207626 | A1 | 8/2013 | Chiba |
| 2014/0043017 | A1 | 2/2014 | Patterson, III et al. |
| 2014/0125357 | A1* | 5/2014 | Blondin ............ G01R 27/2605 324/658 |
| 2014/0203753 | A1* | 7/2014 | Weinl .................. H02P 25/064 318/650 |
| 2014/0298785 | A1 | 10/2014 | Müller et al. |
| 2015/0048893 | A1 | 2/2015 | Heid et al. |
| 2015/0282308 | A1* | 10/2015 | Meyer ................. H01L 25/105 361/729 |
| 2015/0362340 | A1 | 12/2015 | Montagne |
| 2016/0006441 | A1 | 1/2016 | van der Wagt et al. |
| 2016/0209240 | A1* | 7/2016 | Pfaffinger .......... G01D 5/2033 |
| 2016/0363463 | A1 | 12/2016 | Niwa et al. |
| 2017/0006667 | A1 | 1/2017 | Falcon et al. |
| 2017/0276517 | A1 | 9/2017 | Acker |
| 2018/0076834 | A1 | 3/2018 | Wloczysiak et al. |
| 2018/0188076 | A1* | 7/2018 | Acker ................... G01D 5/204 |
| 2018/0193925 | A1* | 7/2018 | Ketelaer ............. B23B 31/02 |
| 2018/0195881 | A1* | 7/2018 | Acker ................... G01B 7/02 |
| 2018/0287603 | A1 | 10/2018 | Subramanian et al. |
| 2018/0372512 | A1* | 12/2018 | Acker ................. G01D 5/2046 |
| 2019/0025087 | A1 | 1/2019 | Acker |

FOREIGN PATENT DOCUMENTS

| | | |
|---|---|---|
| CN | 101545754 A | 9/2009 |
| CN | 101963514 A | 2/2011 |
| CN | 102003973 A | 4/2011 |
| CN | 103562683 A | 2/2014 |
| CN | 103792026 A | 5/2014 |
| CN | 103906995 A | 7/2014 |
| CN | 103278181 B | 3/2016 |
| DE | 3903278 A1 | 8/1990 |
| DE | 4006885 A1 | 10/1990 |
| DE | 4330140 A1 | 3/1995 |
| DE | 4311973 A1 | 2/1997 |
| DE | 19725806 A1 | 1/1999 |
| DE | 19738834 A1 | 3/1999 |
| DE | 19738836 A1 | 3/1999 |
| DE | 19745236 A1 | 5/1999 |
| DE | 19812965 A1 | 10/1999 |
| DE | 10128010 A1 | 1/2003 |
| DE | 69816218 T2 | 2/2004 |
| DE | 102005007731 A1 | 8/2006 |
| DE | 60029113 T2 | 12/2006 |
| DE | 102006026543 A1 | 12/2007 |
| DE | 102006046531 A1 | 4/2008 |
| DE | 102008015837 A1 | 10/2009 |
| DE | 102009027997 A1 | 1/2011 |
| DE | 102013204494 A1 | 10/2014 |
| DE | 112015000542 T5 | 10/2016 |
| EP | 0337939 A2 | 10/1989 |
| EP | 0629842 B1 | 3/1999 |
| EP | 1306649 A1 | 5/2003 |
| EP | 1744184 A2 | 1/2007 |
| EP | 1391735 B1 | 10/2012 |
| WO | 2014200105 A1 | 12/2014 |
| WO | 2015028002 A1 | 3/2015 |
| WO | 2015129229 A1 | 9/2015 |

OTHER PUBLICATIONS

German Search Report for German Application No. 10 2016 202 402.7, dated Oct. 18, 2016, with partial translation—9 pages.
International Search Report and Written Opinion for International Application No. PCT/EP2017/053292, dated Jun. 19, 2017—9 pages.
Chinese Office Action for Chinese Application No. 201680042609.2, dated Aug. 2, 2019, with translation, 20 pages.
European Decison to Grant a Patent for European Application No. 16753607.7, dated Oct. 23, 2019, 45 pages.
Notice of Allowance for U.S. Appl. No. 15/740,562, dated Oct. 23, 2019, 13 pages.
German Search Report for German Application No. 10 2015 215 331.2, dated Nov. 28, 2016, 13 pages.
International Search Report and Written Opinion for International Application No. PCT/EP2016/068158, dated Nov. 18, 2016, 8 pages.
German Search Report for German Application No. 10 2016 202 403.5, with partial translation, dated Jan. 10, 2017, 11 pages.
International Search Report and Written Opinion for International Application No. PCT/EP2017/053295, dated Jun. 19, 2017, 9 pages.
Notice of Allowance for U.S. Appl. No. 15/741,593, dated Nov. 26, 2019, 15 pages.
Non Final Office Action for U.S. Appl. No. 15/741,593, dated Jan. 2, 2019, 31 pages.
Final Office Action for U.S. Appl. No. 15/741,593, dated Jun. 14, 2019, 23 pages.
Non Final Office Action for U.S. Appl. No. 16/063,910, dated Jan. 3, 2020, 16 pages.
Non Final Office Action for U.S. Appl. No. 16/063,910, dated Apr. 21, 2020, 20 pages.
Chinese Office Action for Chinese Application No. 201780008392.8, dated Mar. 23, 2020, with translation, 18 pages.
Final Office Action for U.S. Appl. No. 16/063,910, dated Aug. 17, 2020, 18 pages.

* cited by examiner

SENSOR

CROSS REFERENCE TO RELATED APPLICATIONS

This application is the U.S. National Phase Application of PCT International Application No. PCT/EP2017/053292, filed Feb. 14, 2017, which claims priority to German Patent Application No. 10 2016 202 402.7, filed Feb. 17, 2016, the contents of such applications being incorporated by reference herein:

FIELD OF THE INVENTION

The invention relates to a sensor, which can be used, for example, to detect a route or a position. Sensors of this kind can be used, for example, in automobiles in order to detect measurement variables such as, for example, the current position of a pedal or of a controller.

BACKGROUND OF THE INVENTION

Known sensors are often complicated in terms of design and in terms of wiring connection

SUMMARY OF THE INVENTION

An aspect of the invention aims to provide a sensor that is embodied in an alternative manner, for example in a simpler manner, compared to known sensors.

An aspect of the invention relates to a sensor. The sensor has a circuit carrier. The sensor has a number of attachment inductances. The sensor also has at least one printed circuit board inductance, which is coupled to the attachment inductances. In this case, it may be, in particular, a magnetic coupling, an electrical coupling or an electromagnetic, or electrical and magnetic, coupling that is involved.

The attachment inductances are preferably applied to the circuit carrier using SMD technology.

A sensor of this kind has proven to be simple in terms of production and in terms of application. Said sensor permits, in particular, precise detection of numerous measurement variables, which arise, for example, in a vehicle.

It should be understood that the term "inductance" here typically means a coil in the form of a component or of another physical embodiment.

The coupling between the printed circuit board inductance and the attachment inductances can depend, in particular, on external circumstances, for example on a specific measurement variable. This permits the detection of the measurement variable, for example in such a way as will be described in more detail further below.

The printed circuit board inductance can be implemented, in particular, underneath the attachment inductances in the circuit carrier. This permits an advantageous coupling, in particular a magnetic coupling. Unnecessary distances can be prevented in this way. In other words, the attachment inductances can be implemented directly above the printed circuit board inductance.

The printed circuit board inductance can be implemented, in particular, in the form of a number of conductor tracks in the circuit carrier. Said conductor tracks can be enclosed, for example, at the surface of the circuit carrier or else in the circuit carrier. This can also be combined. For example, two, three or more planes can be used in this way, wherein each plane has a number or a plurality of conductor tracks. However, only one plane can also be used.

In particular, it has proved to be advantageous to guide through as many conductor tracks under the attachment inductance in each plane as the selected circuit carrier technology allows as a maximum. In the connection plane of the attachment inductance, the advantageously usable space is typically limited to the interspace of the connections; in other planes, the edge regions of the attachment inductance can also be crossed in an advantageous manner.

For example, the use of ten conductor tracks is cited as a possible embodiment, wherein, by way of example, an upper plane has four conductor tracks and a lower plane has six conductor tracks.

The sensor can have, in particular, a plurality of attachment inductances, which are electrically connected in series. This permits a common evaluation of all of the attachment inductances.

The sensor can also have a plurality of attachment inductances, which are each individually connected to an electronic control unit. This permits a separate evaluation of the attachment inductances. This can advantageously be carried out, in particular, in connection with a wiring connection described further below.

It should be noted that a number of elements in the context of this application is understood in principle to mean one such element or several such elements, whereas a plurality is understood to mean at least two such elements.

Preferably, the sensor also has a measurement body, which can be moved relative to the circuit carrier. Said measurement body can influence, in particular, the coupling already mentioned, which can be measured at the measurement inductances.

The measurement body can be moved, in particular, with respect to position and/or location relative to the circuit carrier. This makes it possible to link the measurement body to a measurement variable that is to be measured, for example the instantaneous position of a pedal or of a controller.

The measurement body can be, in particular, ferromagnetic and/or electrically conductive. Said measurement body can thus be ferromagnetic and electrically non-conductive, said measurement body can be non-ferromagnetic and electrically conductive or said measurement body can be ferromagnetic and electrically conductive. Materials of this kind can advantageously influence the coupling between the printed circuit board inductance and the measurement inductances, which can be measured in the context of an evaluation.

The measurement body can be embodied, in particular, in a planar and/or multipart manner. This makes the adaptation to specific circumstances possible.

According to one development, the measurement body is embedded in an elastically deformable object. Said object can then be connected, for example, to another element or connected thereto in a suitable manner so that the object elastically deforms when a variable that is to be measured, for example the position of a pedal, changes. Instead of an elastically deformable object, a generally deformable object can also be used. The measurement body then concomitantly moves accordingly within the object, which can be detected by means of an evaluation of the measurement inductances, as already mentioned.

The sensor can be embodied, in particular, as a position and/or force sensor. This corresponds to typical applications for which the sensor has proven to be particularly suitable.

The attachment inductances can be arranged, for example, along a path or a circumference. This permits the adaptation to specific measurement situations. The path can be, for example, a straight or a linear path. However, it can also be a bent path. By way of example, the path can also correspond to a circular arc segment or to a segment of an ellipse or to another geometric object. For example, the measurement body can be designed to move along the path. This permits a particularly advantageous detection of the position of the measurement body.

According to one embodiment, the printed circuit board inductance is a reference inductance, wherein the attachment inductances are respective measurement inductances. According to an embodiment as an alternative thereto, at least one of the attachment inductances is a reference inductance and the printed circuit board inductance is a measurement inductance.

A reference inductance is understood to mean, in particular, an inductance that is excited by a circuit and generates a magnetic field, which magnetic field then penetrates the measurement inductances and induces a measurable signal therein. Accordingly, measurement inductances are understood to mean, in particular, inductances that serve to detect or measure such a magnetic field or another corresponding signal.

The measurement inductances can be electrically interconnected, in particular, in series and/or in parallel. In this case, recourse can be made to any desired variations. It is thus possible, for example, for some of the measurement inductances to be interconnected in series; others can be interconnected in parallel. Owing to a series interconnection or owing to a parallel interconnection, individual or several measurement inductances can be evaluated together. This permits, for example, a faster detection or the use of specific effects.

The reference inductance preferably generates a magnetic field when current flows through, said magnetic field penetrating the measurement inductances and preferably being changed by the measurement body depending on the position and/or the location of the measurement body. This permits the measurement principle already outlined further above, which principle is based on the change in a magnetic field or a coupling between the reference inductance and the measurement inductances.

The reference inductance can also be referred to as a coupling inductance, for example, since said reference inductance typically generates the magnetic field that is then coupled into the measurement inductances.

According to one development, the sensor also has a capacitance, which is interconnected with the reference inductance to form a parallel resonant circuit. Furthermore, according to this development, the sensor has an electronic control unit, wherein the electronic control unit is connected directly to the parallel resonant circuit. This can mean, for example, a direct conductive connection, for example a wiring connection or the embodiment as corresponding conductor tracks, or else a connection by means of one or several resistors.

The electronic control unit is configured to excite the parallel resonant circuit into oscillation at an excitation frequency that is derived from a clock of the electronic control unit. This makes it possible to excite the parallel resonant circuit so that an alternating current flows through the reference inductance, which alternating current leads to a corresponding alternating magnetic field, which can be used for measurement.

Moreover, the electronic control unit is connected directly to each of the measurement inductances and is configured to measure a value, which indicates at least one measurement variable, at the respective measurement inductance. Such a measurement variable can be, for example, the position of a measurement body or the location thereof. However, said measurement variable can also be, for example, the position of a pedal of a motor vehicle, of a controller or of another variable that is to be evaluated. It is also possible to say that the value is influenced by such a measurement variable.

Such an embodiment makes it possible, in particular, to advantageously use a measurement principle that can be scaled in virtually any desired manner without considerable outlay. This means, in particular, that a multiplicity of measurement inductances can be used and hence a very high resolution and/or a particularly long measurement range can be achieved, without complicated wiring being required. Essentially just one input of the electronic control unit and one corresponding electrical connection is required for each measurement inductance used. The excitation frequency can be different from a resonant frequency of the parallel resonant circuit preferably by no more than 25%, preferably no more than 20%, particularly preferably no more than 15%, even more preferably no more than 10%. This has been found to be advantageous in practice.

The excitation frequency may, in particular, be able to be set, wherein it can be controlled, in particular, by an element with a variable frequency.

A lock-in amplifier can advantageously be used for measuring.

The first inductance, the measurement inductance and/or the capacitance can be, for example, components having a respective tolerance of between 1% and 10%, preferably of 1%, or of less than 1%. Such tolerances have been found to be advantageous.

The measurement inductance can be coupled, for example, galvanically or magnetically to the reference inductance.

According to one development, the parallel resonant circuit can have a maximum Q factor obtained through maximization of a value of $Vt*Vt/V0$. Here, $Vt$ denotes a ratio of coil current and supply line current given maximum deviation of the capacitance and of the reference inductance from their respective values at the resonant frequency of the parallel resonant circuit. $V0$ denotes a ratio of coil current and supply line current for respective values of capacitance and reference inductance at the resonant frequency of the parallel resonant circuit. Such a procedure has proven to be particularly advantageous for typical applications.

The maximum Q factor can be limited particularly by interconnection of a resistor in the parallel resonant circuit.

The electronic control device can be configured, in particular, to measure one or more of the following characteristic values using the measurement inductances:
 self-inductance or inductance,
 resistance loss,
 complex impedance,
 angle loss,
 mutual inductance in relation to the first inductance.

The sensor can advantageously have two, three or more than three measurement inductances. For example, it can also have four, five or more than five measurement inductances. In particular, in the circuit just mentioned, the number of measurement inductances can be scaled in a particularly simple manner.

According to another development, the sensor has a plurality of measurement inductances, wherein each measurement inductance has a magnet core associated therewith. The measurement inductances are arranged along a path and are furthermore electrically connected in series. The measurement inductances in this case have respective inductances or inductance values, which increase along the path in one direction. The feature referred to here as inductance is the inductance as an electrical property of an inductor.

This makes it possible to jointly evaluate all the measurement inductances using the different values of the respective inductance. This also makes it possible to simply scale to a multiplicity of inductances.

According to one embodiment, the measurement inductances are in this case connected in series along the path. This makes simple evaluation possible. However, it is understood that other interconnections that are not oriented on the path are also possible.

In particular, in such an embodiment, the measurement body may be able to be moved along the path, as a result of which advantageous measurement of the position of said measurement body is possible.

In this case, the sensor is preferably configured to generate a common output signal, in particular a total inductance, depending on the position of the measurement body along the path.

The measurement body can be, for example, a ferromagnetic, highly permeable body, an electrically conductive body or else a permanent magnet.

The respective magnet cores preferably do not have remanent magnetization.

The circuit carrier may be, in particular, a printed circuit board, a leadframe or a molded-interconnected-device (MID) carrier.

The measurement inductances are preferably spaced apart so close to one another that, when the measurement body moves along the path, a characteristic curve of the total inductance is produced, said characteristic curve increasing or falling monotonously at least over half of the path, preferably over at least three quarters of the path or else over the entire path. This allows advantageous evaluation and prevents ambiguities.

The sensor can have, for example, a guide, which guides the measurement body. Such a guide can guide the measurement body, in particular, along the mentioned path.

The sensor can have an actuating element by means of which the measurement body can be moved from outside, for example along the path.

In general, the use of SMD inductances as elements of inductive sensors is advantageous because various arrangements, in which the magnetic fields of the sensors can be formed by the SMD elements in an application-specific manner, can be provided thereby, because the arrangement of the elements on a circuit carrier constitutes a cheap, well-controlled technology and the elements themselves are cheap.

Particularly good scalability is also provided, as also already mentioned in individual embodiments. This permits the use of a particularly large amount of measurement inductances.

The plurality of measured parameters can be used, for example, to determine several independent measurement variables using an inductive system. This can include, inter alia, vectorial variables, which are to be perceived as several variables in accordance with the number of vector components.

Cross-sensitivities of the inductive system can be eliminated by virtue of the additionally measured variables being removed from the measurement result by way of calculation by virtue of, for example, a system of equations being compiled with all measurement variables and being solved in a computation unit.

Resolution and/or sensitivity can be increased by virtue of different measurement ranges for the same measurement variable being combined, for example by collating individual elements to expand the measurement range or by using the Nonius principle.

The described system can also be regarded, for example, as a measurement transformer. It can be said, for example, that a reference inductance acts together with the magnetic flux generated thereby on the measurement inductances, wherein the measurement variable determines the coupling between the primary and secondary side.

In SMD inductances, it is possible to consider, for example, mounting directly next to one another or behind one another on the same side or above one another on opposite sides of a circuit carrier. The last variant does not have any restrictions with respect to design rules.

It can also generally be said that printed circuit board inductances and SMD inductances are combined so that together they form a distinct flux linkage. To this end, for example, SMD inductances can be soldered to a circuit carrier, in particular in a conventional manner. Conductor tracks, which belong to a printed circuit board, cross underneath the inductance. The SMD inductance also advantageously has an open magnetic circuit, that is to say there should be no highly permeable path for the flux of the inductance, which flux runs only within the component. Owing to this arrangement, the magnetic fluxes of the two inductances are effectively linked to one another, wherein the spacing of the conductors of both inductances from the core material of the SMD inductance is typically low and the flux linkage is influenced only to a small degree by tolerances of the manufacturing process.

The described arrangement can also be referred to as an SMDPT (SMD planar transformer). The flux linkage is in this case typically determined predominantly or almost exclusively by the area around the highly permeable core of the SMD inductance.

An inductive system based on an SMDPT can have, for example, one or more SMDPTs, that is to say a number of SMDPTs, and no, one or more inductances that are not SMDPTs. A combination of inductances of different designs is thus very generally possible as well.

Since the flux linkage of an SMDPT, like in other transformers too, is bidirectional, both inductances from which an SMDPT is composed are considered in principle as primary and secondary inductance.

Since the flux of an SMDPT runs in parts both above and below the circuit carrier, both sides are generally used for influencing the flux linkage by conductive or ferromagnetic bodies or also by other bodies.

An inductive system based on an SMDPT can connect the primary and/or secondary inductances of SMDPTs in series and/or in parallel circuits. For example, the crossing conductor tracks under several SMD inductances can thus particularly advantageously form a single winding. It is likewise advantageous to connect several SMD inductances as primary inductances in series.

It is clear that the circuit carrier can also be used to integrate the measurement circuit with the inductive system. For example, the electronic control unit mentioned above can be integrated on the circuit carrier in this way.

A sensor system based on an SMDPT typically has an inductive system having at least one SMDPT and a measurement circuit, which measurement circuit is capable of sending an alternating current through at least one inductance and of measuring at least one electrical parameter, such as, for example, a real or imaginary part of the impedance, at at least one electrically or magnetically coupled inductance. A particularly preferable measurement circuit for a sensor system of this kind is described further below with reference to FIG. 1.

BRIEF DESCRIPTION OF THE DRAWINGS

Further features and advantages will be gathered by a person skilled in the art from the exemplary embodiment described below with reference to the appended drawing, in which.

DETAILED DESCRIPTION OF THE PREFERRED EMBODIMENTS

Figure 1:
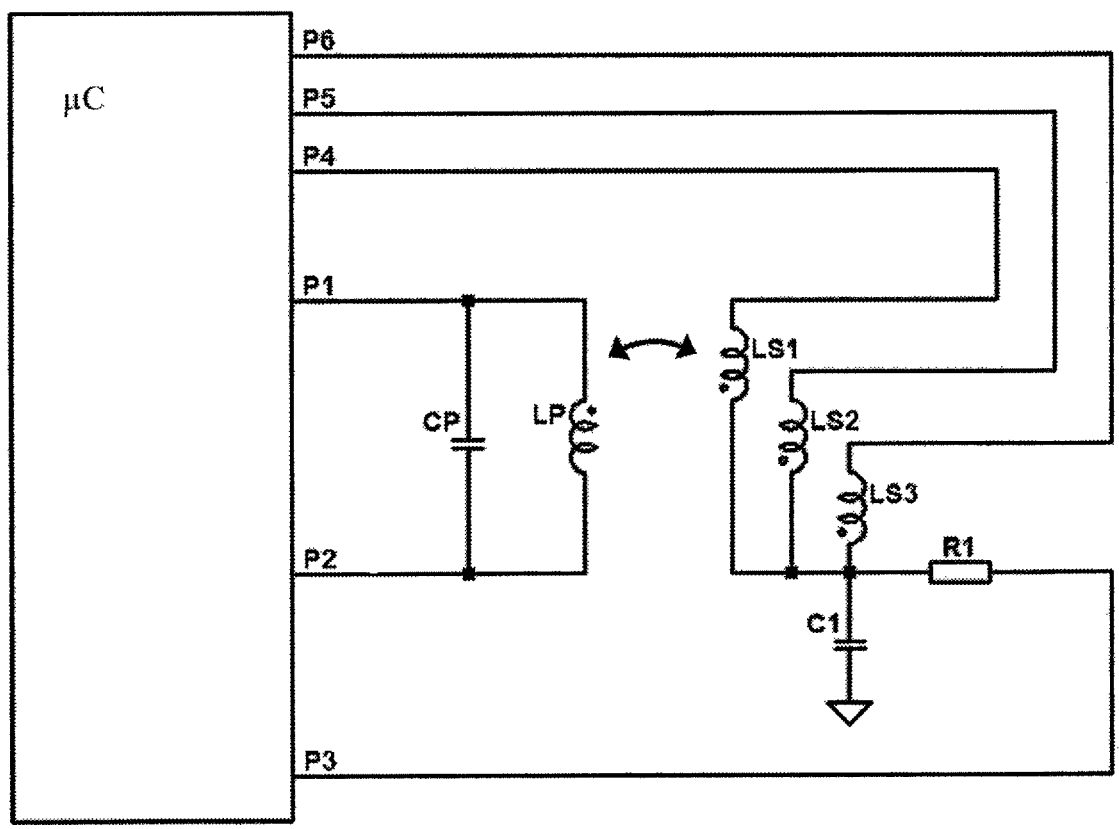
FIG. 1: shows a measurement circuit.

FIG. 1 shows an exemplary embodiment of a measurement circuit, which can advantageously be used with the sensor according to an aspect of the invention. In this case, an electronic control unit is provided in the form of a microcontroller μC. Said microcontroller has a total of six ports, which are denoted by P1, P2, P3, P4, P5 and P6.

A parallel resonant circuit is connected at the ports P1 and P2, which parallel resonant circuit consists in the present case of a reference inductance LP and a capacitor CP connected in parallel therewith.

A resistor R1 is connected at the port P3, a smoothing capacitor C1 being connected in turn to said resistor. The smoothing capacitor C1 is connected to ground on the opposite side.

In this way, a defined voltage can be set at the pole of the resistor R1 opposite the port P3 and, specifically, in particular, by suitable pulse-width modulation at the port P3. Connected to said pole are three measurement inductances LS1, LS2, LS3, which are electrically connected directly to the ports P4, P5 and P6. The measurement inductances LS1, LS2, LS3 are magnetically coupled to the reference inductance LP. When this coupling is influenced by a measurement body (not illustrated), the position and/or location of the measurement body can be identified by evaluating corresponding signals of the measurement inductances LS1, LS2, LS3.

The reference inductance LP can be, in particular, the printed circuit board inductance described further below. The measurement inductances LS1, LS2, LS3 can be, in particular, the attachment inductances described further below.

Figure 2:
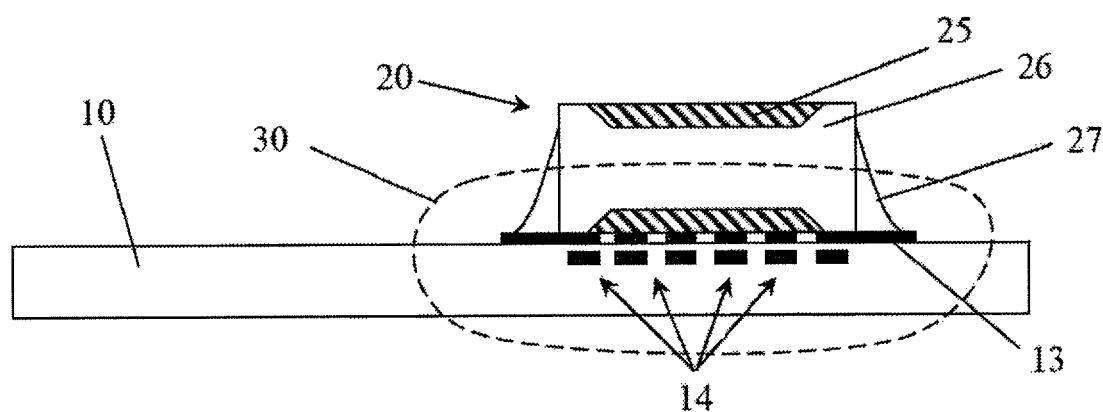
FIG. 2: shows an SMD planar transformer.

FIG. 2 shows an element arrangement of an SMD planar transformer (SMDPT), which in various combinations can form inductive systems. In this case, an SMD inductance or attachment inductance 20 is mounted on a circuit carrier 10, which is shown in section. Said SMD inductance or attachment inductance has a core 26, which is surrounded by a winding 25. Connection terminals, which are not shown separately, are connected using solder 27 to corresponding pads 13 on the circuit carrier 10.

Conductor tracks 14 of the attachment inductance 20 cross underneath the attachment inductance 20 in two layers. Said conductor tracks 14 are constituent parts of a printed circuit board inductance. Said printed circuit board inductance is embodied in two planes, as shown, wherein in the upper plane four conductor tracks 14 pass between the pads 13 and six conductor tracks 14 are situated in the lower plane, since pads are no longer located there. All of the conductor tracks 14 contribute to the flux linkage, even if the linkage at the edge might be somewhat lower.

The flux linkage itself is illustrated by a representative field line 30. However, it should be understood that the field of the SMD planar transformer also has field lines outside and inside said representative pathway.

A sensor or an inductive system is preferably composed of several arrangements as shown in FIG. 2. It is thus possible, for example, for several attachment inductances to be arranged in series perpendicular to the plane of the drawing of FIG. 2 in order to determine a change in a measurement variable, which is expected along this direction. In order to effect overall a flux linkage to the conductor tracks 14 of the printed circuit board inductance for said inductances, the conductor tracks 14 are to be extended in a straight line advantageously only perpendicular to the plane of the drawing under all the attachment inductances 20. This constitutes the simplest case of how a planar inductance can be linked with many attachment inductances. In other arrangements, the conductor tracks 14 are conducted, for example, according to a distribution of attachment inductances according to the intended use, wherein said attachment inductances may be wound, for example.

Figure 3:
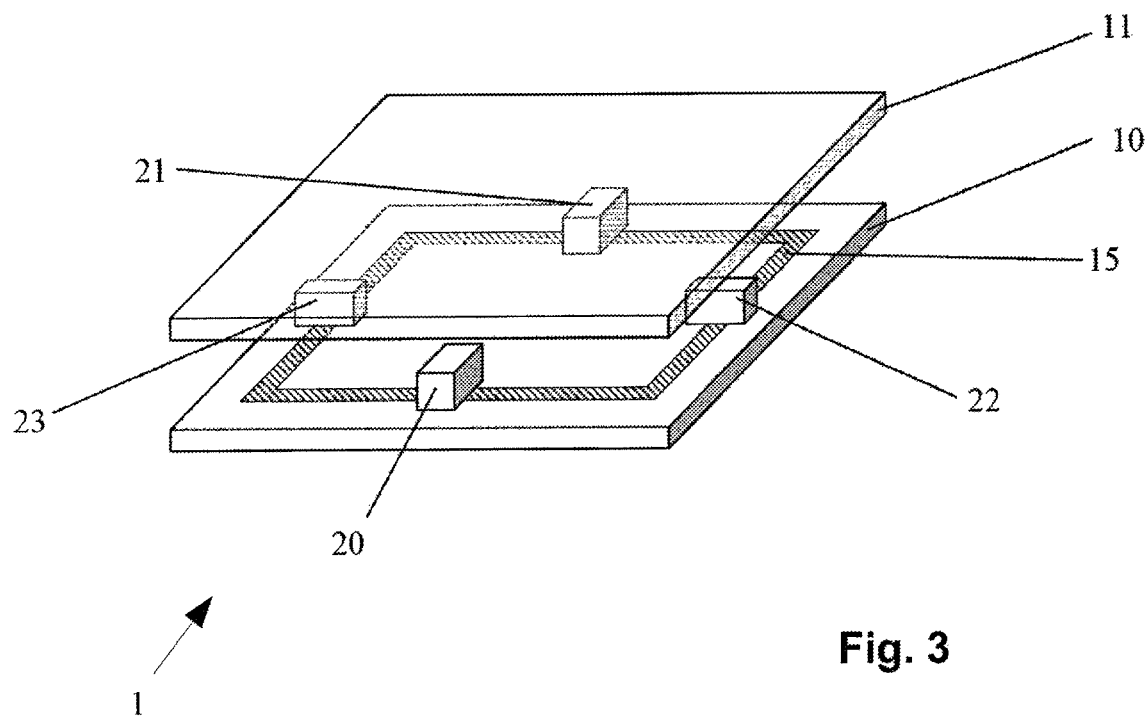
FIG. 3: shows a sensor.

FIG. 3 shows a sensor 1 according to an exemplary embodiment of an aspect of the invention. Such a sensor 1 can be advantageously used for small changes in position or as a force sensor, wherein the procedures described above can be used to realize in a particularly advantageous manner a sensor that can detect the respective measurement variable in several spatial dimensions. The design described below and illustrated in FIG. 3 serves for this purpose.

A total of four attachment inductances, namely a first attachment inductance 20, a second attachment inductance 21, a third attachment inductance 22 and a fourth attachment inductance 23, which cross a printed circuit board inductance 15, are located on a circuit carrier 10, which in the present case is a printed circuit board. The printed circuit board inductance 15 is part of the circuit carrier 10. Each crossover between the printed circuit board inductance 15 and the attachment inductances 20, 21, 22, 23 is embodied as in FIG. 2, wherein only the details of the design are not illustrated in FIG. 3 in the same level of detail. As a result, an SMD planar transformer is located in each case at the positions of the attachment inductances 20, 21, 22, 23. A conductive or ferromagnetic body 11 for influencing the flux linkage in each SMD planar transformer is located above the circuit carrier 10, underneath it or on both sides. In the present case, said body 11 is thus a measurement body 11.

The movement of the measurement body 11 can now be detected by the inductive system in several dimensions when said body is connected to a measurement circuit. To this end, recourse can preferably be made to the circuit that is illustrated in FIG. 1 and has been described further above. An advantageous exemplary option for the wiring consists in using the printed circuit board inductance 15 as a reference inductance LP and using each of the attachment inductances 20, 21, 22, 23 as a measurement inductance LS. To this end, the circuit shown in FIG. 1 is advantageously to be extended by a further channel for measuring a further measurement inductance. The option of carrying this out in a simple manner and with little outlay constitutes an important strength of said circuit.

The attachment inductances 20, 21, 22, 23 are applied to the circuit carrier 10 using SMD technology.

The movement of the measurement body 11 is measured in the direction perpendicular to the circuit carrier 10 by virtue of the fact that the measurement body 11 approaches all the attachment inductances 20, 21, 22, 23 or moves away therefrom, as a result of which the flux linkage is influenced uniformly in all four SMD planar transformers. In the two dimensions along the circuit carrier 10, the edges of the measurement body 11 are located in the vicinity of the SMD planar transformers. A shift of the measurement body 11 thereby causes a greater or lesser amount of the measurement body 11 to be located in the direct magnetic area of influence of the respective SMD planar transformer. The flux linkage at the attachment inductances 20, 21, 22, 23 is therefore influenced in pairs in a differential manner. On account of the linear independence of the influencing of the flux linkage through movements of the measurement body 11 in the various dimensions, it is possible to determine the dimensions after measurement of the flux linkage at the four SMD planar transformers separately by way of calculation.

In principle, the arrangement of FIG. 3 is sensitive to movements of the body 11 in five dimensions because rotations of the body 11 about axes located in the plane of the circuit carrier 10 also lead to a differential change in the flux linkage. The arrangement can therefore also be used to measure rotations of this kind. However, it is also possible to measure fewer dimensions, for example three dimensions.

When using such embodiments, care is advantageously taken that dimensions that may not be distinguishable do not occur together or that, when the corresponding rotations and linear movements overlap as a result, this does not play a role. As an alternative, the arrangement can be expanded by further SMD planar transformers, which permit further differentiation.

It should be understood that the measurement body 11 does not have to have the shape illustrated in FIG. 3. Since it typically comes down to just the constituent parts of the measurement body 11, which parts are located in direct proximity to the SMD planar transformer, the measurement body 11 can equally well be round or cross-shaped or another shape. For example, the measurement body 11 can also be disassembled into four or another number of individual parts, that it to say can be embodied in multipart form, wherein said individual parts are advantageously located in direct proximity to the SMD planar transformers and can be connected to construction elements whose magnetic properties are irrelevant for the function. Another desired number of parts of the measurement body 11, for example three, two, five or six parts, can also be used.

Figure 4:
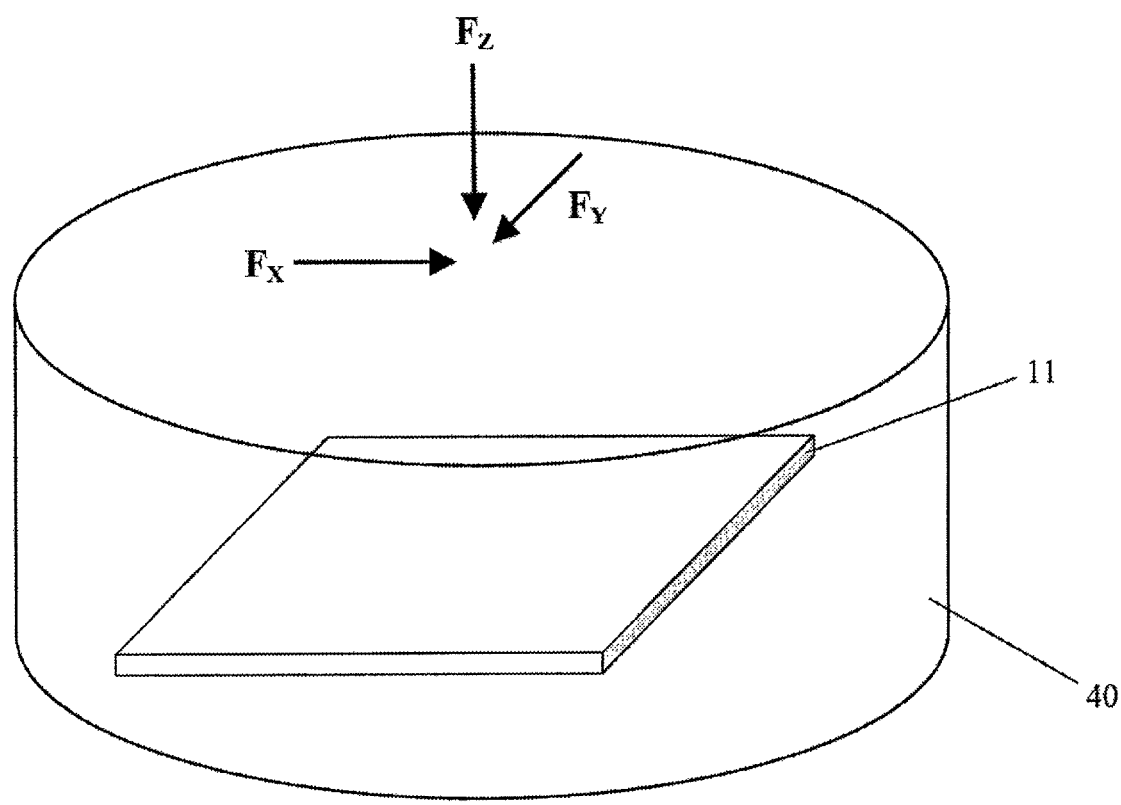
FIG. 4: shows a measurement body in a deformable object.

FIG. 4 illustrates an arrangement of the measurement body 11 in an elastically deformable object 40, which is advantageous, in particular, for use as a three-dimensional force sensor. For this application, the measurement body 11 is embedded into the elastically deformable object 40, which can have the shape of a cylinder, for example. However, said object can also have other shapes such as, for example, that of a cone, a truncated cone or a sphere. A surface of the elastically deformable object 40 is designed so that it can be connected to the circuit carrier 10 (not illustrated here) and the extensions thereof. The circuit carrier 10 and the measurement body 11 are in this case advantageously positioned with respect to one another as described above. If forces are now introduced at the top side of the elastically deformable object 40, as is illustrated in FIG. 4 by the force arrows Fx, Fy, Fz, the elastic deformations caused by the introduction of force can be measured, as has been described further above.

The claims that are part of the application do not represent any dispensing with the attainment of further protection.

If it turns out in the course of the proceedings that a feature or a group of features is not absolutely necessary, then the applicant aspires right now to a wording for at least one independent claim that no longer has the feature or the group of features. This may be, by way of example, a subcombination of a claim present on the filing date or may be a subcombination of a claim present on the filing date that is limited by further features. Claims or combinations of features of this kind requiring rewording can be understood to be covered by the disclosure of this application as well.

It should further be pointed out that configurations, features and variants of an aspect of the invention that are described in the various embodiments or exemplary embodiments and/or shown in the figures can be combined with one another in any way. Single or multiple features can be interchanged with one another in any way. Combinations of features arising therefrom can be understood to be covered by the disclosure of this application as well.

Back-references in dependent claims are not intended to be understood as dispensing with the attainment of independent substantive protection for the features of the back-referenced subclaims. These features can also be combined with other features in any way.

Features that are disclosed only in the description or features that are disclosed in the description or in a claim only in conjunction with other features may fundamentally be of independent significance essential to aspects of the invention. They can therefore also be individually included in claims for the purpose of distinction from the prior art.

The invention claimed is:
1. A sensor, having
a circuit carrier,
a number of attachment inductances, and
at least one printed circuit board inductance, which is coupled to the attachment inductances,
wherein the attachment inductances are soldered to the circuit carrier using SMD technology.

2. The sensor as claimed in claim 1,
wherein the printed circuit board inductance is implemented underneath the attachment inductances in the circuit carrier.

3. The sensor as claimed in claim 1,
wherein the printed circuit board inductance is implemented in the form of a number of conductor tracks in the circuit carrier.

4. The sensor as claimed in claim 1,
wherein the attachment inductances are each individually connected to an electronic control unit.

5. The sensor as claimed in claim 1,
which also has a measurement body, which can be moved relative to the circuit carrier.

6. The sensor as claimed in claim 5,
wherein the measurement body can be moved with respect to position and/or location relative to the circuit carrier;
and/or
wherein the measurement body is ferromagnetic and/or electrically conductive.

7. The sensor as claimed in claim 5,
wherein the measurement body is embodied in a planar and/or multipart manner;
and/or
wherein the measurement body is embedded in an elastically deformable object.

8. The sensor as claimed in claim 1,
which is embodied as a position and/or force sensor.

9. The sensor as claimed in claim 1,
wherein the attachment inductances are arranged along a path or a circumference.

10. The sensor as claimed in claim 1,
wherein the printed circuit board inductance is a reference inductance and the attachment inductances are respective measurement inductances;
or
wherein at least one of the attachment inductances is a reference inductance and the printed circuit board inductance is a measurement inductance.

11. The sensor as claimed in claim 10,
wherein at least some of the measurement inductances are electrically interconnected in series and/or in parallel.

12. The sensor as claimed in claim 10,
wherein the reference inductance generates a magnetic field when current flows through, said magnetic field penetrating the measurement inductances and being changed by the measurement body depending on the position and/or the location of the measurement body.

13. The sensor as claimed in claim 10,
which has a plurality of measurement inductances,
wherein each measurement inductance has a magnet core associated therewith,
wherein the measurement inductances are arranged along a path,
wherein the measurement inductances are electrically connected in series, and
wherein the measurement inductances have respective inductances, which increase along the path in one direction.

14. The sensor as claimed in claim 6,
wherein the measurement body is embodied in a planar and/or multiparty manner;
and/or
wherein the measurement body is embedded in an elastically deformable object.

15. The sensor as claimed in claim 11,
wherein the reference inductance generates a magnetic field when current flows through, said magnetic field penetrating the measurement inductances and being changed by the measurement body depending on the position and/or the location of the measurement body.

16. A sensor, having
a circuit carrier,
a number of attachment inductances, and
at least one printed circuit board inductance, which is coupled to the attachment inductances,
wherein the attachment inductances are applied to the circuit carrier using SMD technology, and
wherein the attachment inductances are electrically connected in series.

17. A sensor, having
a circuit carrier,
a number of attachment inductances,
at least one printed circuit board inductance, which is coupled to the attachment inductances, wherein the printed circuit board inductance is a reference inductance and the attachment inductances are respective measurement inductances or at least one of the attachment inductances is a reference inductance and the printed circuit board inductance is a measurement inductance, and further having:
a capacitance, which is interconnected with the reference inductance to form a parallel resonant circuit, and
an electronic control unit,
wherein the attachment inductances are applied to the circuit carrier using SMD technology,
wherein the electronic control unit is connected directly to the parallel resonant circuit and is configured to excite the parallel resonant circuit into oscillation at an excitation frequency that is derived from a clock of the electronic control unit, and
wherein the electronic control unit is connected directly to each of the measurement inductances and is configured to measure a value, which indicates at least one measurement variable, at the respective measurement inductance.

\* \* \* \* \*